United States Patent [19]

Glover

[11] Patent Number: 4,998,882

[45] Date of Patent: Mar. 12, 1991

[54] COLOR INDICATING DEVICES

[75] Inventor: Richard D. Glover, Ossett, England

[73] Assignee: R.G.S. Pattern Book Co. Limited, Ossett, England

[21] Appl. No.: 560,012

[22] Filed: Jul. 27, 1990

Related U.S. Application Data

[63] Continuation of Ser. No. 333,492, Apr. 4, 1989, abandoned.

[30] Foreign Application Priority Data

Apr. 26, 1988 [GB] United Kingdom ............... 8809825

[51] Int. Cl.$^5$ .............................................. G09B 29/00
[52] U.S. Cl. ......................................... 434/98; 434/72
[58] Field of Search .................. 434/98, 99, 100, 103, 434/75, 72, 81; 40/124.4

[56] References Cited

U.S. PATENT DOCUMENTS

| | | | |
|---|---|---|---|
| 1,612,791 | 7/1922 | Ames et al. | 434/98 X |
| 1,957,816 | 5/1934 | Braeg | 434/98 |
| 2,172,172 | 9/1939 | Mount | 206/232 X |
| 2,268,238 | 10/1940 | Bell | 434/98 |
| 2,409,285 | 10/1946 | Jacobsen | 434/98 |
| 4,211,016 | 7/1980 | Eldar | 434/98 |
| 4,476,167 | 10/1984 | Duffler | 28/147 X |

OTHER PUBLICATIONS

*Display World,* "P-O-P of the Month", Aug. 1969, p. 44.

Primary Examiner—Richard J. Apley
Assistant Examiner—Rachel M. Healey
Attorney, Agent, or Firm—Klauber & Jackson

[57] ABSTRACT

Colored yarn poms are color coded according to a six digit coding and are arranged in a particular manner to enable color selection for carpets to be performed by designers, architects and the like without actually examining a sample carpet or a portion of carpet. The color poms are arranged in groups of which one pom defines the base color, and the remaining poms in that group are shaded poms, tint poms and tone poms. The triangular layout provides that the base color bunch is at the apex of a right angled triangle with the shades extending down one of the smaller sides of the triangle and the tints extending down the other side with the tones lying between the shades and the tints. The triangle is an isosceles triangle. Each pom preferably comprises a plurality of appropriately colored yarns held by a sleeve so that the yarn ends spread mushroom fashion from one end of the sleeve and a second sleeve can be slid over the first sleeve to compress the spread ends into a flat surface which can be presented to a spectrophotometer for identifying the color density in the said flat face.

10 Claims, 5 Drawing Sheets

COLOR INDICATING DEVICES

This application is a continuation of application Ser. No. 07/333,492, filed Apr. 4, 1989 now abandoned.

BACKGROUND OF THE INVENTION

This invention relates to colour indicating devices, which are similar in nature to the well known colour charts which are used for colour selection in picking colours, for example of paints for the painting of walls, buildings and the like.

As is well known, painters and decorators when asked by customers as to colour selection for surface finishes, present such customers with a colour chart and the customer makes his choice. A colour chart comprises essentially a chart with small areas of paint thereon, each area being coloured with a small section showing the colour of paint which is available.

SUMMARY OF THE INVENTION

The present invention is concerned with the provision of a colour indication device displaying a comprehensive colour spectrum for use in connection with the selection of colours for textile fabrics, in particular carpets, and the colour indication device of the present invention involves the provision of small bunches of yarn (poms) of the respective colours available.

Such is the demand today for variation in colour that manufacturers must offer a wide range of different shades, tints and tones of each of a large number of base (or hue) colours with the minutest and measured variations between the different hues. The expression "tint" as used herein applies to poms which are coloured to various degrees with the base colours plus white only, the expression "shade" as used herein applies to poms which are coloured to various degrees with the base colour plus black only and the expression "tone" as used herein applies to poms which are coloured to various degrees with the base colour plus some white and some black. In accordance with an aspect of the invention a base colour is given a two digit designation such as 00 and then each pom in a group is given two further digits to indicate the degree of "tint" and two further digits to indicate the degree of "shade".

The number of steps of possible variation in the amount of white added or the amount of black added, may be set out in as many as 100 steps or more, and therefore it can be appreciated the extent of variation which can take place and indeed which is currently demanded, is very large, because it should also be borne in mind that there are mixed variations to provide tone poms employing the addition of some white colouring and some black colouring.

The present invention is concerned in a first aspect with a colour indication device in which a base colour or preferably a plurality of base colours is or are indicated by a pom or poms coloured in said base colour or colours and held together so as to exhibit a tufted-like end, and associated with the or each base colour pom are a plurality of tint, shade and tone poms of different tints, shades and tones of the base colour resulting from the progressive addition of more white and more black and mixtures thereof in the colouring. For the purposes of simplicity of explanation, the or each set of poms comprising the base pom and its tint, shade and tone poms will be referred to hereinafter as a "group" of poms.

In accordance with the present invention, a group of poms as related to a particular base colour are arranged in a holder so as to be in triangular formation, with the base colour pom at one apex of the triangle, and along one of the legs of the triangle leading from such apex, the tint poms are graded whilst along the other leg of the triangle leading from the apex the shade poms are graded, and the remaining area of the triangle is filled with the tone poms.

Preferably, the triangle is a right angled triangle, and the base pom is at the apex where the right angle of the triangle is formed, and the other two angles of the triangle are 45° angles.

By adopting such a display arrangement, pairs of triangles or four triangles can be arranged to define a square, making the triangles particularly suitable for being held in square display boxes.

The invention also provides a kit comprising a plurality of the triangles, each displaying a different base colour pom, its shade poms, its tint poms and its tone poms, such triangles being arranged in pairs to form squares, and the squares being held in a square carrying case.

Each triangle preferably is in the form of a sheet of resilient material, such as a flexible foam which is rubbery in nature so that it can be flexed, with apertures therein to receive the individual poms frictionally, and each sheet is preferably contained in its own triangular carrying case on the outside of which there may be applied a label indicating the base colour of the colour poms contained therein.

The kit may also include a shelf for supporting the triangular boxes in a suitable display manner for example with the hypotenuses of the boxes facing outwardly so that a user can see at a glance the respective colours indicated in the respective boxes.

In an alternative arrangement, the triangular samples can be grouped together in pairs or in fours and be held in appropriately shaped boxes, and these larger boxes can be interconnected in the nature of pages of a book so that the pages can be turned over to enable a user to examine all of the colours available and the shades, tints and tones thereof relatively quickly.

The preferred arrangement of the invention is therefore triangular holders for the groups of poms, the triangular holders being in particular right angled/45° triangular configurations so as to be capable of being grouped into square array in pairs or in fours, so as to be capable of being held in square boxes or square carrying cases, and so that the triangular casings may be readily positioned on the shelf side by side and with colour indications viewable by the person wishing to inspect the samples.

Preferably, the kit includes right angled triangular scales each of the same size as the triangular formation so as to be positionable over same, said scales comprising tint scale markings extending along one of the scale sides from the right angle apex to one end of the hypotenuse and the shade scale markings extending from the right angle apex to the other end of the hypotenuse and a first set of grid lines extending parallel to one of the shorter sides and a second set of grid lines extending and parallel to the hypotenuse, the scale being transparent except for said scale markings and grid lines.

Preferably, there are two of said scales one of which is a mirror image of the other to be used with respective groups of poms which are laid out in opposite hands as regards the tint and shade poms.

The invention also provides a pom assembly for use in a colour indicating system as aforesaid, said pom assembly comprising a small bunch of yarns of a particular base colour shade, tint or tone held by a sleeve so that the yarn ends project from one end of the sleeve and diverge therefrom, and a second sleeve slidable on the first sleeve and positionable over said spread yarn ends to bring them together to define a flat surface which can be presented to a spectrophotometer.

The invention further provides a numbering system for the identification of coloured poms of which there are a plurality of base colour poms, and for each base colour pom there are tint colour poms, scale colour poms and tone colour poms, said numbering system comprising each pom with a six digit number of which the first two digits indicate the base colour, the second two digits indicate one of the tint and shade and the last two digits indicate the other of the tint and the shade.

In order to facilitate understanding of the invention in its various aspects, an embodiment thereof is now described, by way of example, with reference to the accompanying diagrammatic drawings, wherein:

DESCRIPTION OF THE PREFERRED EMBODIMENTS

Figure 1:
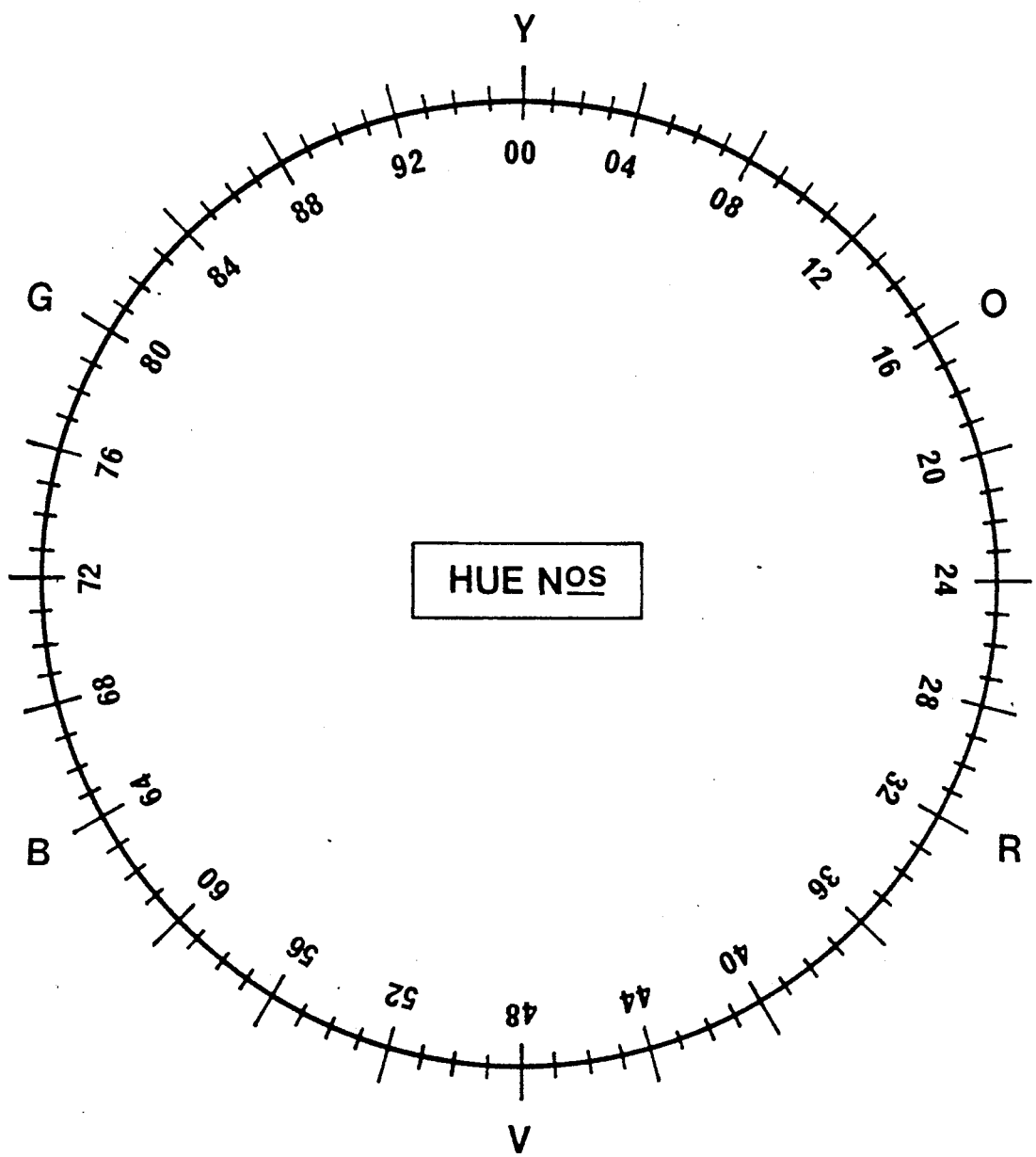
FIG. 1 is a spectrum diagram indicating the base colour digits of the kit according t the invention.

FIG. 1 shows a circular spectrum chart with the spectrum colours yellow (Y), orange (0), red (R), violet (V), blue (B) and green (G) indicated thereon. A person wishing to select a colour for a carpet would initially consult this chart as it identifies colour with two digit from 00 to 95. The circular chart is in fact sub-divided into 96 base colours or hues, and each of these base colours is associated with its own tints, shades and tones in order to provide a colour selection system.

Figure 3:
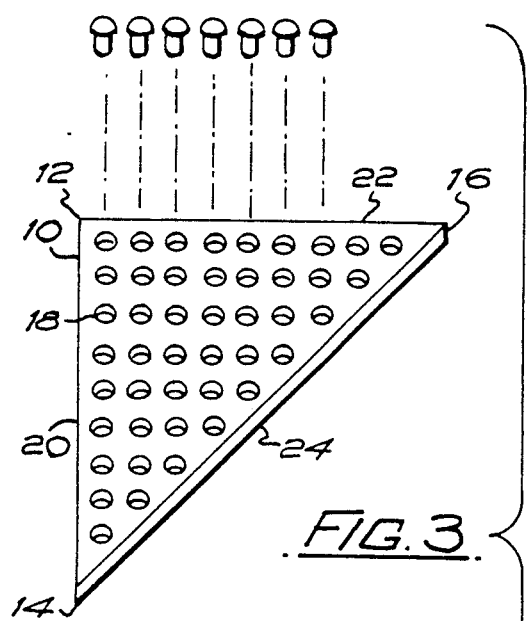
FIG. 3 is an exploded perspective view of a group of poms of a particular base colour its tints, shades and tones.
Figure 4:
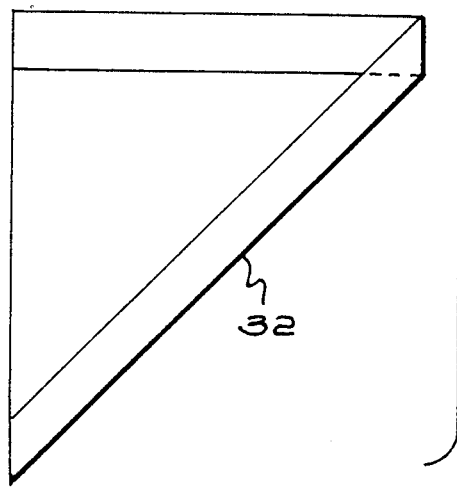
FIG. 4 shows the assembled group when in its triangular container.
Figure 4:
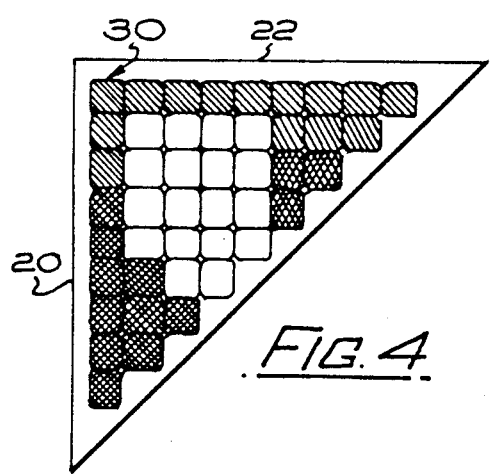
Figure 8:
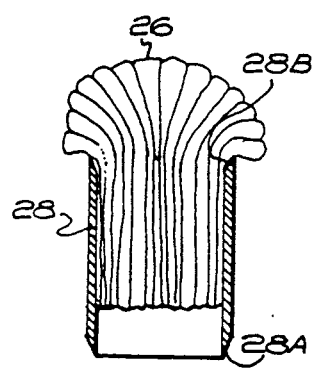
FIG. 8 is an enlarged sectional elevation of one of the yarn poms and its holding sleeve.
Figure 9:
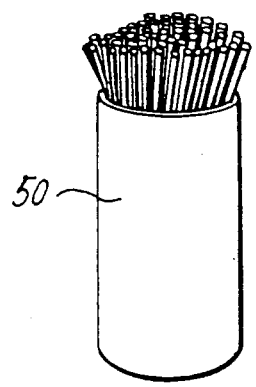
FIG. 9 is a perspective view of a pom such as is shown in FIG. 8.

Referring now to FIGS. 3, 4 and 8, a display unit for displaying colours as applied to yarn poms as related to a single and particular base colour, comprises a flexible sheet member 10 which is triangular in shape, and at the apex 12 the angle defined is a right angle, whilst the other apices 14 and 16 define 45° angles.

The sheet has a plurality of apertures 18 therein, which are evenly arranged so that there are nine apertures adjacent the triangle side 20 and nine apertures adjacent the triangle side 22 which respectively emanate from the apex 12. The apertures 18 are arranged in rows parallel to the hypotenuse 24 of the triangle and in such rows there are progressively one less aperture in the direction from the hypotenuse 24 to the apex 12. In the aperture at the apex 12 is positioned a base colour pom comprising a bunch 26 of yarns held bunched by means of a sleeve 28 as shown in FIG. 8, so that the pom has the shape of a mushroom. The pom which is inserted in the single aperture adjacent apex 12 is the base colour for this particular device, and such pom is indicated by reference 30 in FIG. 4. In FIG. 3 a plurality of poms are shown, but as will be appreciated from FIG. 4, each of the apertures 18 receives a pom. The sleeve 28 on the outside is chamfered as shown at 28A to facilitate placement of the pom in its aperture 18 and is internally chamfered as shown at 28B in FIG. 8 to facilitate entry of the yarns into the sleeve and spreading of the yarns as shown in FIG. 8.

Considering FIG. 4 in more detail, from the base colour pom 30 and along the respective sides 20 and 22 the poms are on the one hand progressively darker in colour than the base colour to provide the shades, and progressively lighter in colour than the base colour to provide the tints, and this variation is obtained during the dying of the respective samples by adding progressively more black colouring on the one hand, and progressively more white on the other hand. In the intermediate poms between the shades and tints, the black/white colour variation is adjusted accordingly to provide the tones and complete the display device.

As shown in FIG. 3, the device includes a triangular tray 32 which serves to receive the sheet 24 when filled with the poms, the samples simply being push fitted into and frictionally held in the apertures 18. The tray 32 is the same shape as the sheet 24, and the sheet 24 is of a rubbery flexible type material so that it can be readily fitted into the tray 32. The tray is closable by means of a cover of similar shape to complete the particular device. The cover may have an anti-static layer on the inside thereof to prevent the creation of static on the tops of the poms.

Figure 2A:
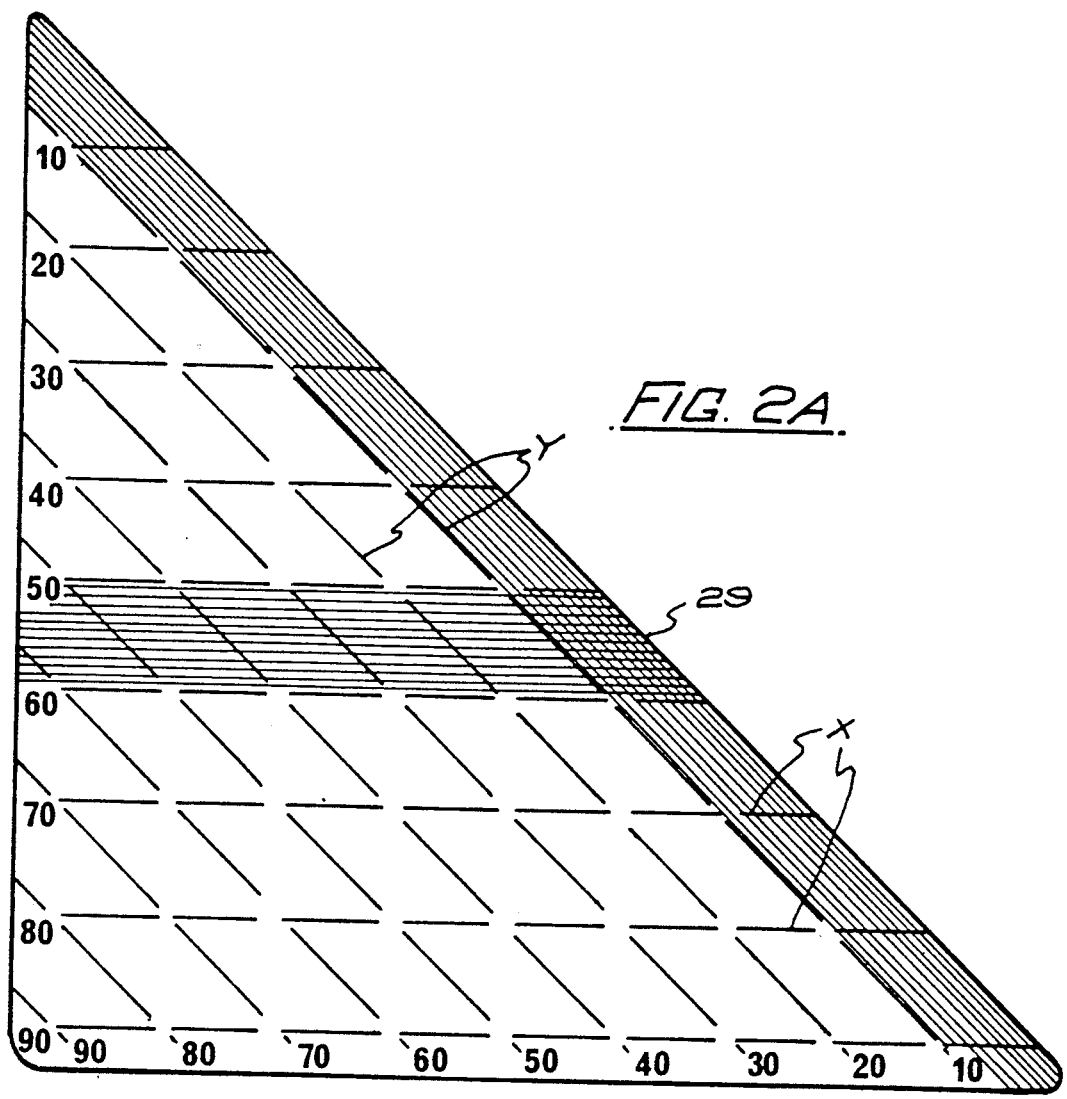
FIGS. 2A and 2B show the triangular scales for use in connection with the groups of poms according to the invention.
Figure 2B:
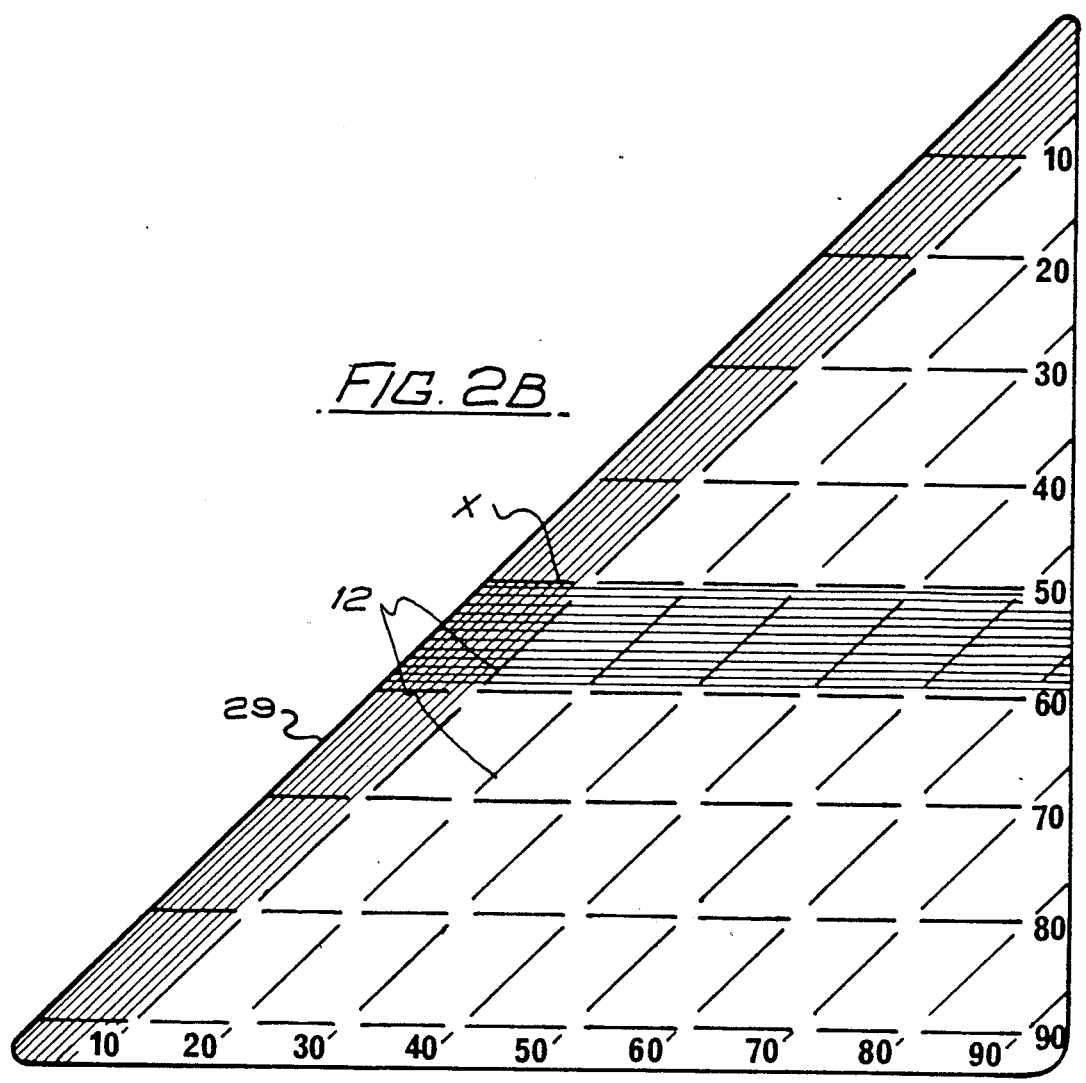
Figure 14:
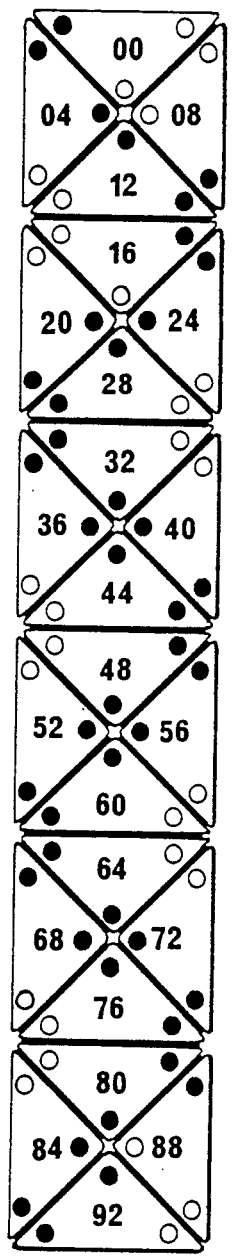
FIG. 14 shows the full colour spectrum of the kit.

To explain the identification system for the poms and the use of the invention to enable a person using the system to be able to identify and order a particular yarn colour with confidence and accuracy, reference is made to FIGS. 2A and 2B in conjunction with FIG. 4 and FIG. 14. Referring firstly to FIG. 14, the twenty four triangular containers each representing a base colour are indicated in interfitted relationship. The triangular containers are coded by two digits 00, 04, 08, 12, 16 . . . and so on up to 92 so that there are twenty four triangular containers in the complete set. The containers are grouped in fours as shown, with the right angles located at the centre of the square array formed by each set of four containers. In this connection, the tints and shades are either arranged in right hand fashion as in the case of for example containers 04 and 08 or in left hand fashion as indicated by containers 00 and 12 to ensure that the blackest shades of a pair of adjacent containers i.e. 00 and 04 will be together, and similarly with containers 08 and 12. For the pairings 00 and 08 on the one hand and 04 and 12 on the other hand, the tints are adjacent. Because of the possibility of right and left hand arrangements, the kit in fact includes two reading scales 2A and 2B which are respectively a left hand reading scale and a right hand reading scale. Each of the scales as shown is of triangular configuration matching the triangular configuration of each box of poms as shown in FIG. 4, and each scale is transparent apart from the marking lines indicated thereon. On the X axis is marked a scale 90, 80, 70 and so on and a similar scale is marked on the Y axis. A first set of scale lines X extend parallel to the X axis, and a second set of scale lines Y extend parallel to the hypotenuse 29 of each scale. Where these main scale lines intersect, they are broken to leave viewing dots which in fact centre in the centres of the poms when a scale is placed as appropriate on a pom container such as shown in FIG. 4. Between each set of scale lines X and Y the scale is sub-divided by ten subdivisions only two of which are shown in each of FIGS. 2A and 2B for clarity of illustration. The scales of FIGS. 2A and 2B are in themselves novel and inventive, and are used in the colour selection process for selecting and identifying any colour of the sum 1,080 poms in the complete set shown in FIG. 14. A particular pom may have a designation for example 00 40 90 which would be a complete description of the pom colour. However, should a colour which is not exactly illustrated by one of the poms be required, it is possible to specify any one of a large number of such colours by the use of intermediate identification values, and from such values a dyer may obtain the requisite colour recipe predictions by using the intermediate values of adjacent poms.

To obtain an intermediate value between triangles of poms, it being remembered that the set illustrated provides that only every fourth base colour is contained in the set one should choose the two poms from the corresponding positions in adjacent triangles. For example specifying colour 02 60 40 would give a colour halfway between sample hues 00 and 04 in position 60 40 of similar colour characteristics but using the hue halfway between the two. By comparing these two poms, the target colour can be visualised. Similarly if only a very slight hue change is required reference digit 01 60 40 could for example be specified.

To obtain an intermediate value within a triangle, one uses either the scale of FIG. 2A or 2B and obtains an intermediate colour code digit. For example an intermediate colour halfway between 00 60 40 and 00 60 30 can be specified as 00 60 35, or alternatively an intermediate position between 00 60 40 and 00 70 50 would be 00 65 45. It is also possible to select a colour between any four poms. For example 00 65 40 which will have the colour characteristics mid-way between the colours of the four surrounding poms. In these ways, it is possible to communicate codes for colours with much smaller differences than those described.

To obtain intermediate values outside a triangle it is possible to make a projection by providing a code number. For example, 00 95 60 would be lighter in colour than 00 90 60 whilst number 00 40 45 would be chromatically stronger than 00 40 40 and 00 45 05 would be slightly darker and greyer than 00 50 10.

It will be understood that the first two digits of each code number indicates the base colour; the second two digits indicate the amount of one of the black and white in the colour and the other digit indicates the amount of the other of the black and white.

Although the complete set of the devices of the kit comprises twenty four containers as shown in FIG. 14, it can be appreciated that the set may have more or less of such containers depending upon the number of hue or base colours required to be displayed.

Figure 5:
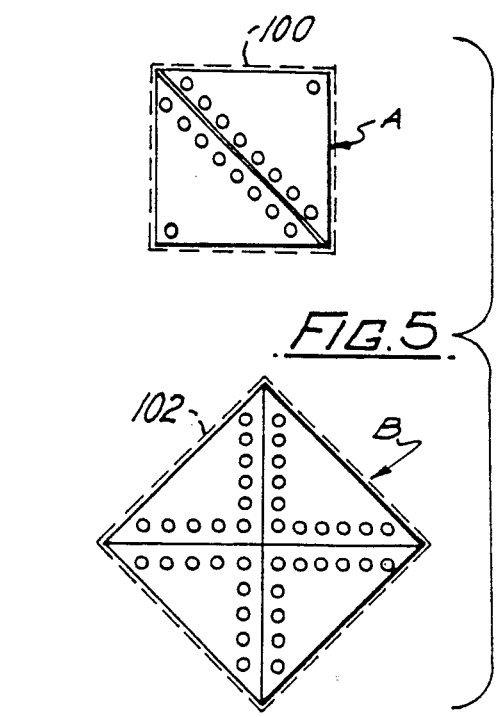
FIG. 5 shows two ways in which the various triangular containers can be positioned side by side into square array.
Figure 6:
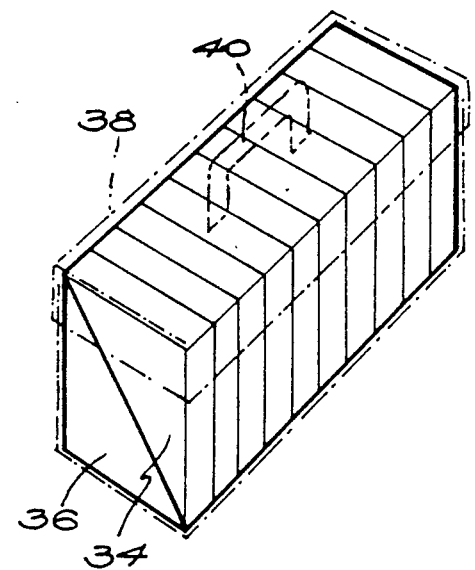
FIG. 6 illustrates a carrying case with a complete set of triangular containers therein.

To this end, the invention also provides that the plurality of containers are arranged as shown in FIG. 6 in pairs such as 34 and 36 to make up square assemblies which fit side by side into a suitable carrying case 38 as shown in chain-dotted lines in FIG. 6 so that the entire set can be carried from place to place. The case 38 has a handle 40 for this purpose. Alternatively, a square case 100 or 102 as shown in FIGS. 5A or 5B, respectively, can be provided.

Figure 7:
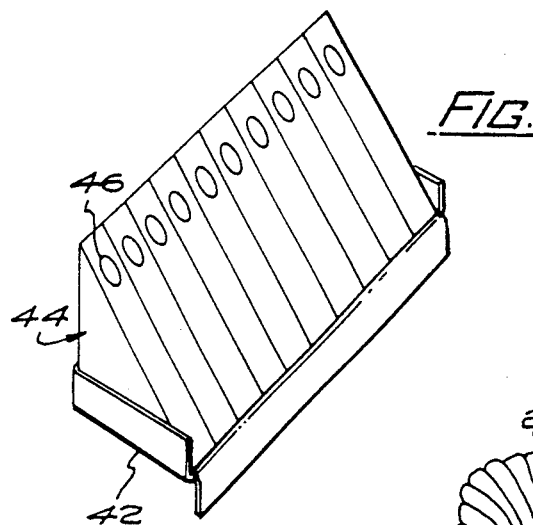
FIG. 7 shows how the triangular containers can be displayed on a display shelf.

For the display of the containers there is preferably provided a shelf 42 as shown in FIG. 7 which may be a synthetic plastics material shelf, and the containers are received as indicated by reference 44 with their hypotenuses arranged in a common plane, which plane will incline upwardly and away from the viewer. On each hypotenuse side of each container there is a designation 46 indicating the base colour which, with its tints, shades and tones, will be contained in a particular container.

Instead of presenting the containers as shown in FIG. 7, the containers may be arranged as indicated at A in FIG. 5 or at B in FIG. 5. In arrangement A, pairs of containers are arranged with their hypotenuses face to face, and the samples contained therein will be viewable. When the containers are arranged in this fashion, the triangular apices of the respective containers which have the blackest shades adjacent thereto, are preferably arranged side by side, and to achieve this as indicated herein the poms will be arranged in opposite handed fashion.

With the B arrangement, as shown in FIG. 5, the apices 12 of four containers are arranged adjacent to provide a larger square, so that all four base colours and their shades, tints and tones will be visible. Again in this arrangement it is preferable for aesthetic purposes that the shades of adjacent devices be arranged side by side.

It is possible to arrange the samples in arrangement A or arrangement B without the use of the container 32, by simply positioning the respective sheets 24 of each device side by side.

Additionally, it is possible to arrange the complete set of devices in the A or B arrangement of FIG. 5 and to provide each sub-set of two devices or four devices as a book page, and the respective book pages being provided in a carrying device in hinged fashion so that the respective colours can be examined by turning of the pages.

Figure 10:
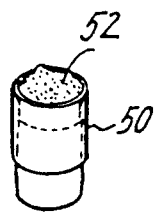
FIG. 10 is a perspective view of the pom of FIG. 9 when used with a standard sleeve for measurement of the colour by a spectrophotometer.
Figure 11:
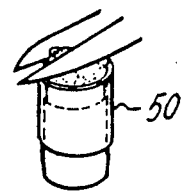
FIGS. 11 and 12 are views showing how the poms when in the sleeve may be trimmed and positioned suitable for presentation to a spectrophotometer.

Referring now to FIGS. 9 to 13, each set of devices preferably includes one or two testing sleeves 50 which can be slipped over any one of the sleeves 28. The sleeves 50 are used for standard testing. These sleeves are used to obtain reproducable colour measurement from colour matching computers. The sleeve 50 is pushed over the pom sleeve from the bottom until the head of the yarn and the top of the testing sleeve 50 are in alignment as shown in FIG. 10. If required yarn ends that are out of position may be trimmed with scissors or the like as shown in FIG. 11 and if the yarn is soiled it should be pushed to the other end of the tube. It is also possible to cut a small amount of the yarn off the pom if necessary.

Figure 12:
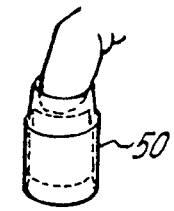
Figure 13:
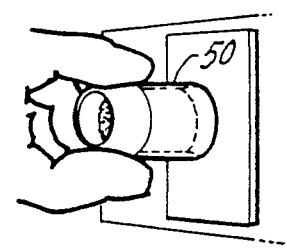
FIG. 13 shows the assembly of pom and sleeve presented in the spectrophotometer for colour measurement.

To proceed with the testing, the pom and the sleeve 50 are placed on a clean flat surface with the pom yarns facing the surface and by means of the finger as shown in FIG. 12, the yarn is pressed down from the inside and bottom of the pom tube until a smooth flat cross-section of pom adjacent the end of the testing sleeve is achieved and lies in perfect alignment with the end of the sleeve 50. This gives an even density of tuft in said plane. The assembly is now presented to a measuring aperture of a spectrophotometer as shown in FIG. 13 so that the said plane of tuft yarns is most efficiently presented to the spectrophotometer. The reflectance values give an indication of die recipes to provide the colour sensed, assuming that the spectrophotometer has the appropriate software and calibration data.

The importance of being able to position the sleeve 50 to the arrangement shown in FIG. 10, is that the flat end face 52 defined by the extremities of the yarn ends form a homogeneous colour surface. That flat surface becomes suitable for presentation to a photospectrometer which can then accurately identify the colour intensity and composition and a grading can be given to that colour. The sleeve 50 performs an important function of compressing the yarn ends to exactly the same degree because obviously if the ends are compressed together to tightly a more intense colour reading will be given from the spectrophotometer, whilst if the yarns are not compressed sufficiently tightly, again an erroneous reading will result. By the use of the arrangement of FIGS. 10 to 13, accurate and recorded information concerning colour intensity can be created, and that information can easily be distributed throughout the world without any transportation of the samples.

It can be seen that by the particular arrangement described a comprehensive colour display system for colour choice in carpets and the like is provided.

I claim:

1. A kit comprising a colour indicating device for use in the selection of a base colour and graded shades, tints and tones thereof, for textile materials comprising:
    (a) a holder which is in the shape of an isosceles triangle and defining a base and two sides of equal length;
    (b) a plurality of yarn poms evenly arranged and filling said triangular holder and comprising a base colour pom at the apex of the triangle between said two sides of equal length, tint poms of progressively increasing tint of the base colour arranged along one of said sides of equal length in a direction from the end of said side adjacent the base pom to the other end of said side, shade poms of progressively increasing shade of the base colour arranged along the other of said sides of equal length in a direction from the end of said side adjacent the base pom to the other end of said side, and tone poms filling the remainder of the triangular holder and being of progressive gradings of shade and tint related to the distance of each of the shade poms from said sides of equal length said kit including a plurality of said triangular holders, each having poms displaying a different base colour, its shades, its tints and its tones, such holders being arranged and grouped to form squares, such that the base colour poms of the holder in each square have a related colour, the squares being held in a square case.

2. A kit comprising a colour indicating device according to claim 1, wherein the triangle is a right angle triangle.

3. A kit comprising a colour indicating device according to claim 1, to form squares, and wherein the tint poms of adjacent holders are adjacent each other and the shade poms of adjacent holders are adjacent each other.

4. A kit comprising a colour indicating device according to claim 3 wherein the kit includes right angled triangular scales each of the same size as each triangular holder so as to be positionable over same, said scales comprising tint scale markings extending along one of the scale sides from the right angle apex to one of the hypotenuse and the shade scale markings extending from the right angle apex to the other end of the hypotenuse and a first set of grid lines extending parallel to one of the shorter sides and a second set of grid lines extending and parallel to the hypotenuse, the scale being transparent except for said scale markings and grid lines.

5. A kit comprising a colour indicating device according to claim 4, wherein there are two of said scales one of which is a mirror image of the other to be used with respective groups of poms which are laid out in opposite hands as regards the tint and shade poms.

6. A kit comprising a colour indicating device according to claim 1, wherein the or each triangular holder contains a sheet of resilient material, which is rubbery in nature so that it can be flexed, with apertures therein to receive the individual poms frictionally.

7. A kit comprising a colour indicating device according to claim 6, wherein the or each triangular holder has applied on the outside base thereof a label indicating the base colour of the colour poms contained therein.

8. A kit comprising a colour indicating device according to claim 6, including a shelf for supporting the triangular holders in a suitable display manner with the bases of the holders facing outwardly so that a user can see at a glance the respective colours indicated in the respective holders.

9. A kit comprising a colour indicating device according to claim 1, wherein each pom comprises a bunch of yarn lengths held by a sleeve so that the yarn length ends project from one end of the sleeve and are spread so as to define a mushroom configuration.

10. A kit comprising a colour indicating device according to claim 9, wherein the sleeve at the other end is chamfered.

* * * * *